United States Patent [19]
Poilleux et al.

[11] 3,719,421
[45] March 6, 1973

[54] OPTICAL DEVICE FOR DETERMINING THE POSITION OF A POINT ON A SURFACE

[75] Inventors: Jean-Loup Poilleux, Vanves; Jean Tourret, Montrouge, both of France

[73] Assignee: Compagnie des Compteurs, Paris, France

[22] Filed: Dec. 10, 1971

[21] Appl. No.: 206,602

[30] Foreign Application Priority Data

Dec. 10, 1970 France..................................7044512

[52] U.S. Cl. ..........................356/4, 356/120, 352/5, 250/201, 250/202
[51] Int. Cl. ................................................G01c 3/08
[58] Field of Search .......356/4, 5, 120; 250/201, 202

[56] References Cited

UNITED STATES PATENTS

| 3,143,588 | 8/1964 | Donald et al. | 356/4 |
| 3,565,568 | 2/1971 | Hock | 356/120 |
| 3,567,320 | 3/1971 | Chitayat | 356/5 |
| 3,481,672 | 12/1969 | Zoot | 356/5 |
| 3,606,541 | 9/1971 | Sugano et al. | 356/120 |
| 3,653,762 | 4/1972 | Harvey | 356/4 |

*Primary Examiner*—Benjain A. Borchelt
*Assistant Examiner*—S. C. Buczinski
*Attorney*—William R. Sherman et al.

[57] ABSTRACT

The optical device comprises a luminous source and an optical system for forming a primary image of the source on the surface whose position is to be determined. The optical system returns some of the light back from the primary image. A beam splitter is provided for splitting the returning light into two beams directed towards two secondary image points. Two optical elements are disposed respectively in these two beams, each optical element controlling the amount of light passing therethrough, and two photoelectric detectors are provided respectively behind the two optical elements to receive the light passing through. Preferably one of the optical elements is a field lens having a central screen, and the other optical element is a diaphragm having a central aperture of the same diameter as the screen. Alternatively both the optical elements can be constituted by field lenses each having a central screen.

9 Claims, 8 Drawing Figures

OPTICAL DEVICE FOR DETERMINING THE POSITION OF A POINT ON A SURFACE

The present invention relates to an optical device for determining the position of a point on a surface. Such devices can be used for example for following the contour of a surface point by point or for following the displacement of a surface.

Mechanical feeler devices are known for following the contour of a surface. In such devices the feeler is mounted in a carriage which can be moved in three dimensional space so as to bring the free or active end of the feeler into contact with the surface. The position of the carriage can be determined precisely with reference to a frame which supports the carriage. If the angle made by the feeler in three dimensional space is known, i.e. the three angles that the feeler makes with relation to three mutually orthogonal reference planes, and if the length of the feeler from the carriage to its active end is also known, then the position of the active end of the feeler can be determined. In the simplest case the length of the feeler is constant. The position of the active end of the feeler, in contact with a point on the surface to be explored, then represents the position of that point in space. If the entire surface is explored in this manner, the result is the contour of the surface.

In some cases the mechanical contact between the feeler and the surface under exploration can constitute a disadvantage. To overcome this disadvantage, optical feeler or probe devices have been proposed in which there is no mechanical contact with the surface.

In the case of an optical feeler or probe, the considerations are similar. The optical probe can be held in a carriage which is movable with respect to a frame and whose position in space can therefore be determined with reference to the frame. The probe is aimed at the point on the surface to be explored, and provided that the direction of the optical axis of the probe is known, as well as the distance along that axis between the carriage and the point — this distance corresponding to the length of the mechanical feeler in the case described above — then the three dimensional co-ordinates of the point being explored can be determined. And once again, if the entire surface is explored in this manner, point by point, the contour of the surface will be determined.

In the case of an optical device of this type, the problem is to determine the distance along the optical axis of the probe from the known reference position constituted by the carriage holding the probe to the surface being explored. Again, as in the mechanical case, the problem is simplified if this distance is maintained constant.

Various optical probe devices are already known for determining the contour of a surface.

In one known optical device the surface is explored by means of a laser beam passing through a lens of fixed focal length. The lens is displaced until the point whose position is to be determined lies in its focal plane, and this position is detected by a maximum in the returning optical radiation passing through the lens in the reverse direction. In other words the returning radiation is a maximum when the point explored coincides with the focal point of the lens. This arrangement has the disadvantage of being complex and not very easy to put into practice.

In another known device, an optical system is used to form a reduced primary image of a luminous source on the surface at the point to be explored. The image on the surface then acts as an object and some of the initial light returns through the same optical system in the reverse direction; a semi-transparent mirror is used to split the beam so as to direct it towards two secondary image points in the two focusing planes of the optical system. Two diaphragms are provided, one of which is positioned in front of one of the focusing planes, and the other is positioned behind the other focusing plane. The light passing through these diaphragms is detected by two photoelectric detectors placed respectively behind their corresponding diaphragms.

When the probe is displaced along its optical axis, i.e. when the distance varies from the probe to the surface, measured along the optical axis of the probe, the light flux passing through the two diaphragms varies correspondingly. The signal from one detector is subtracted from the signal from the other detector, and this difference signal is representative of the distance along the optical axis from the probe to the surface. This difference signal is null when the point under exploration lies in the plane of best focusing of the image on the surface, and this plane thus constitutes a reference plane about which the surface can be displaced relative to the probe.

In operation, the point of best focusing of the image of the source corresponds to the active end of the feeler of a mechanical device, and the distance along the optical axis from the probe to this point of best focusing is fixed.

The optical device just described is satisfactory to the extent that the surface under exploration is perfectly diffusive. However, in practice surfaces never are; they are always at least partially reflective. With such a practical surface this type of probe is limited to the case in which the displacement takes place parallel to its optical axis; in other words, the probe is limited to the case in which the angle of incidence of the optical axis on the surface is constant. It can be shown that if the optical axis of the probe is not normal to the surface, the diaphragmation, by the pupil of the probe objective, of the specularly reflected light, combined with the shift of the diaphragms in front of the detectors with respect to the plane of best focusing, produces a distortion of the output signals of each detector, and in particular a displacement of their maxima. The result is a shift of the zero of the device, which could be interpreted as a variation, as a function of the angle of incidence, of the distance — sometimes referred to herein as the frontal distance — along the optical axis from the probe to the point of best focusing of the image of the source on the surface. This would correspond, in the mechanical case discussed above, to a change in the length of the mechanical feeler from its reference carriage to its active end. Such a variation would, if not corrected for, lead to an error in the determination of the position of the points explored.

An object of this invention is to mitigate these disadvantages in an optical probe of the latter type, so as to permit the determination, without contact, of the co-ordinates of a point on any given surface, the influence of the nature of the surface and of the angle of incidence of the optical axis of the probe on the surface being substantially reduced.

In accordance with the present invention, the prior art device just described is modified by replacing at least one of the diaphragms by a field lens provided with a central screen. In one embodiment of the invention both diaphragms are replaced by corresponding field lenses, each provided with a central screen. In this embodiment the field lenses, like the diaphragms of the prior art, are situated one in front of and the other behind the focusing planes of the optical system returning the light from the surface under exploration.

In another embodiment of the invention, more preferred than the one just defined, only one of the diaphragms of the prior art is replaced by the field lens with its central screen. In this embodiment, both the diaphragm and the field lens are disposed on the same side of the focusing planes of the optical system, either both in front of their corresponding focusing planes or both behind.

In the first embodiment, with two field lenses provided with central screens, the shift of the zero of the device is substantially reduced with respect to the prior art device using two diaphragms, but it is still non-negligible for many applications. If the zero of the device is adjusted to correspond to the desired frontal distance from the probe to the surface for one angle of incidence, usually the normal incidence, it will not correspond to this distance for any other angle of incidence. Rather the error will increase systematically with increasing angle of incidence, as in the prior art case described, but to a substantially lesser extent.

In the second embodiment, with one diaphragm and one field lens having a central screen, it is possible to adjust the device so that its zero corresponds to the correct frontal distance at two (rather than just one) angles of incidence, for example at the normal incidence (0°) and at, say, two thirds of the maximum angle of incidence to be permitted. The maximum shift in the zero with varying angle of incidence is then substantially reduced even with respect to the first embodiment of the invention.

The luminous source used in the optical device according to the invention is preferably constituted by a monochromatic electroluminescent diode of high spectral luminescence and of small emitting area. The emission of the luminous flux can be modulated by injection into the diode of an electric current at a modulation frequency, in which case the detection is syncronous with that frequency so as to eliminate parasitic influences, such as for example the variation in ambiant light.

The invention will be better understood with reference to the following description and to the accompanying drawings given by way of non-limited example.

Figure 1:
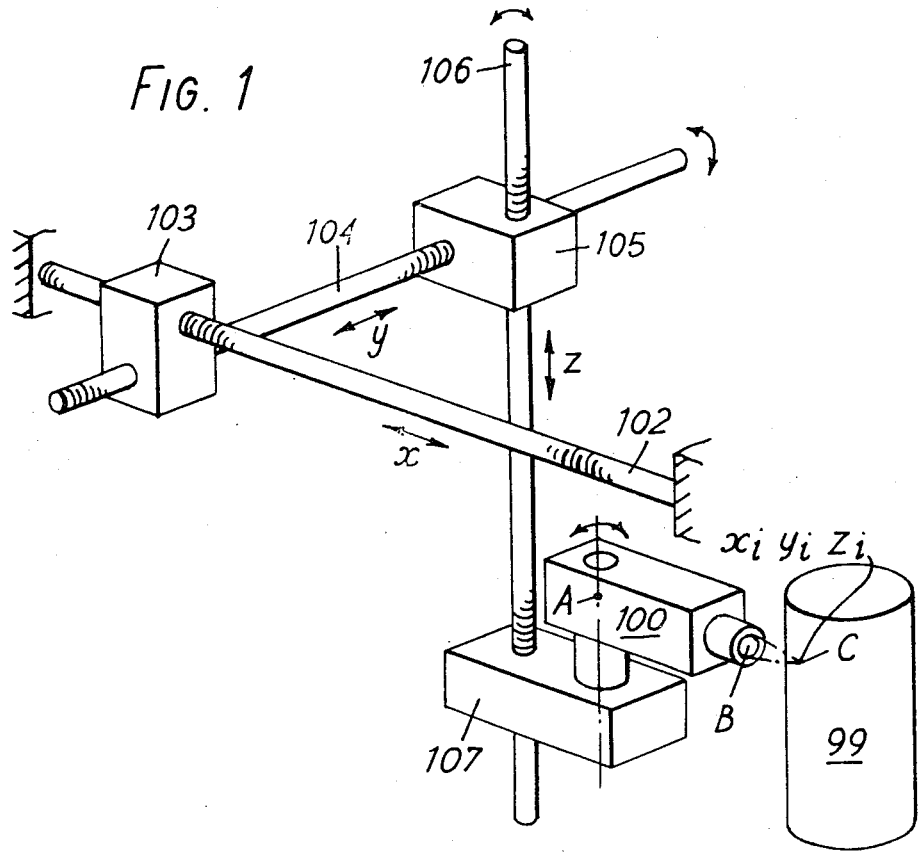
FIG. 1 shows schematically an optical device for determining the contour of a surface, including an optical probe movable on a frame.

Referring to FIG. 1, an optical probe 100, which will be described later, is shown mounted in a frame constituted by three mutually orthogonal lead screws 102, 104 and 106 parallel to the $x$, $y$ and $z$ axes of space.

The $x$ lead screw 102 carries a correspondingly threaded block 103 which can be moved along the $x$ axis by rotating the screw 102. The block 103 carries the $y$ lead screw 104 on which is mounted a threaded block carrying in turn the $z$ lead screw 106. Rotating the $y$ lead screw 104 therefore moves the $z$ lead screw 106 parallel to the $y$ axis. This latter lead screw 106 is also provided with a threaded block or carriage 107, which carries the probe 100 and which can be moved parallel to the $z$ axis by rotation of the screw 106. The probe 100 is positioned, for the sake of convenience, with its optical axis parallel to the $xy$ plane, but it is pivotable in that plane about a point A which is fixed on the carriage 107.

In order to determine the contour of the surface of a solid, for example the cylinder 99 shown in FIG. 1, the surface is explored point by point by turning the $x$, $y$ and $z$ lead screws and pivoting the probe 100 until the probe is directed at the point under exploration, the point C in FIG. 1, and until the frontal distance BC from a reference point B near the free end of the probe to the point C being explored is equal to a predetermined value. This is done optically, without any contact with the surface, in the manner which will be described later. The angular position of the $x$, $y$ and $z$ lead screws gives the position in space of the pivot point A. The length AC is known, and the co-ordinates of the point C can be determined from the angle $\theta$ between the optical axis of the probe and a reference plane, for example the $xz$ plane. The point C can be moved over the entire surface to determine its contour.

In an optical device of this type, the distance BC should always be brought back to the same constant reference value for each point being probed.

Figure 8:
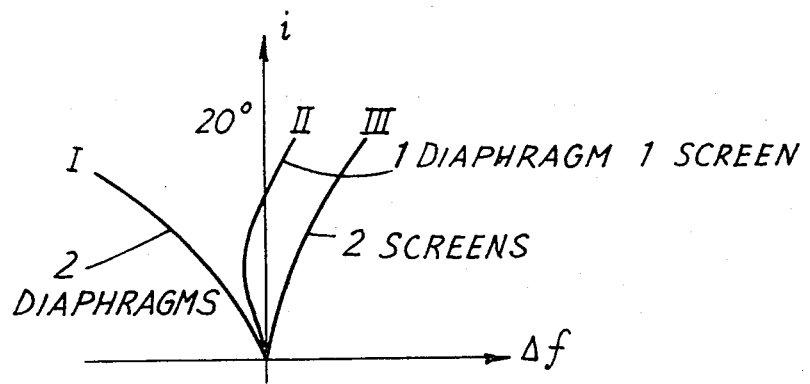
FIG. 8 is a diagram showing the shift of the zero, with varying angle of incidence, of the probes of FIGS. 2, 4 and 6.
Figure 2:
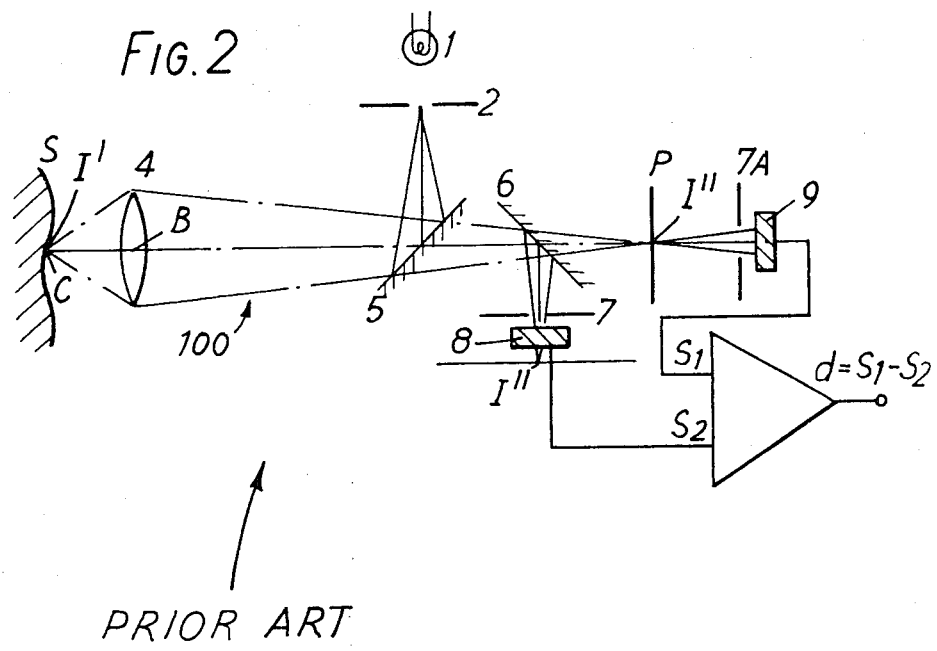
FIG. 2 is a schematic diagram of an optical probe in accordance with the prior art.

FIG. 2 shows schematically an optical probe 100 in accordance with the prior art, which permits this distance BC to be maintained substantially constant under certain ideal conditions of operation. This probe comprises a light source 1, a diaphragm 2 whose aperture is of diameter D, a semi-reflecting mirror 5 disposed at 45° on the optical axis of the probe and an optical system 4, shown schematically as an objective, of magnification G. An image I' — called primary image herein — of the source, of diameter D/G is formed on the surface S under exploration, and some of the flux is returned through the optical system 4 and the semi-reflecting mirror 5 and falls on a beam splitter constituted by another semi-reflecting mirror 6 disposed at 45° on the optical axis and furnishes two images I'' — called secondary images herein — in the two planes of best focusing P at equal optical distances from the surface S. On opposite sides of these planes P are disposed two diaphragms whose apertures are of the same diameter: one 7 upstream, the other 7A downstream with respect to the sense of propogation of the light. Behind these diaphragms 7, 7A are disposed crossing of the difference curve $d$ is shifted by a distance $\Delta f$, which means that, in operation, when the probe is positioned so that the difference signal is null, the real frontal distance will no longer correspond to the reference distance, but will be different from the reference distance by the value $\Delta f$. The magnitude of the zero shift is substantially less in the embodiment of FIG. 4 than in the prior art embodiment illustrated in FIG. 2. This can be seen in FIGS. 3 and 5, but it is more clearly illustrated in FIG. 8, which shows the zero shift $\Delta f$ as a function of the angle of incidence $i$. In FIG. 8, curve II corresponds to the embodiment of FIGS. 4 and 5.

Figure 4:
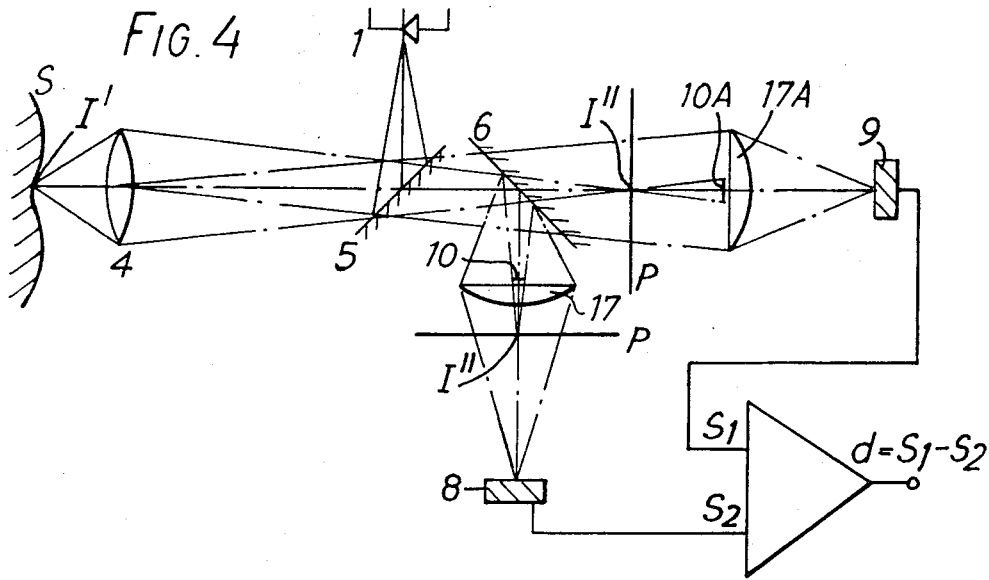
FIG. 4 is a schematic diagram of an optical probe in accordance with the present invention.
Figure 6:
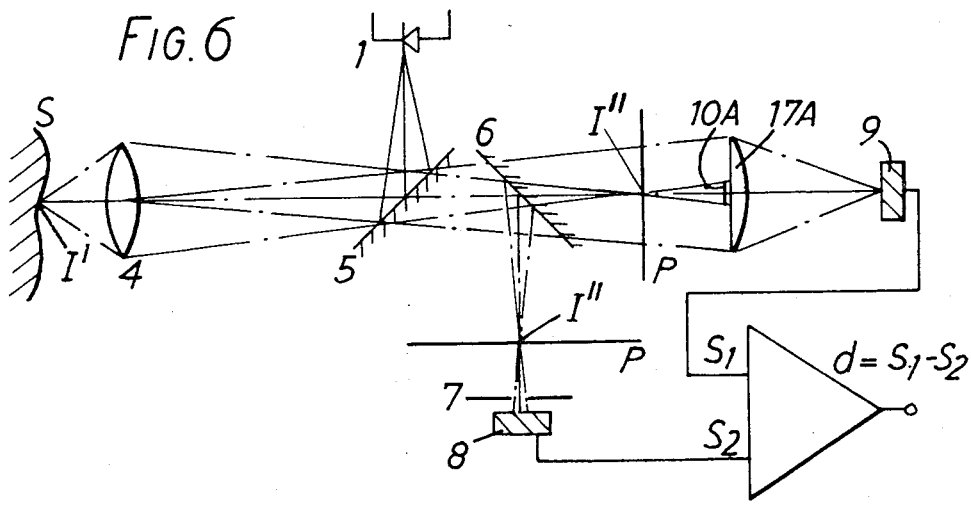
FIG. 6 is a schematic diagram of another embodiment of a probe in accordance with the invention.

Although the embodiment of FIG. 4 constitutes a substantial improvement over the prior art, the zero shift can be reduced still further with the embodiment of FIG. 6, in which the same reference numerals have been used to designate the elements that are common to FIGS. 2 and 4. In this FIG. 6 embodiment, only one of the diaphragms of the prior art, for example the diaphragm 7A, has been replaced by a field lens 17A having a central circular screen 10A of the same diameter as the aperture in the diaphragm 7. With this arrangement however, both the diaphragm 7 and the screen 10A of the field lens 17A are located on the same side of the planes of best focusing P, either both behind these planes as shown in FIG. 6 (and in FIG. 7), or both behind these planes.

Figure 7:
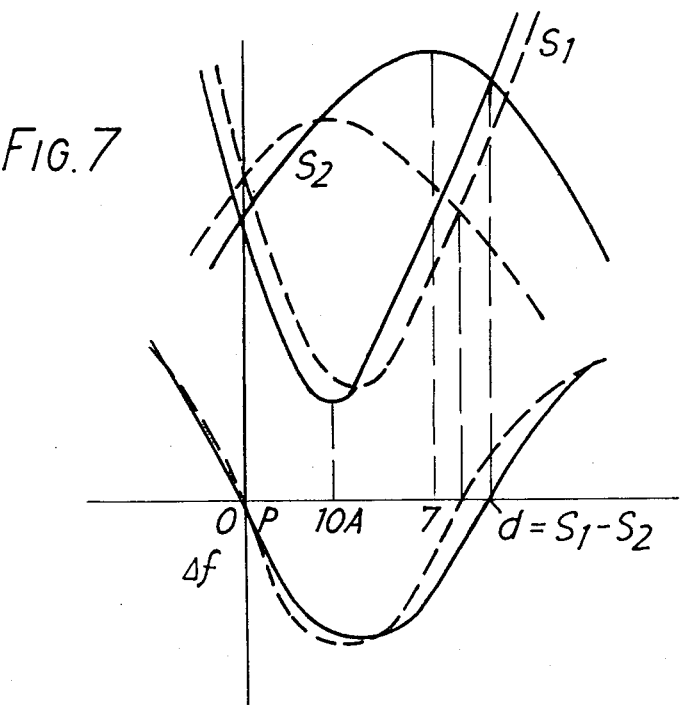
FIG. 7 is a diagram, analogous to FIGS. 3 and 5, of the curves of the output signals of the detectors of the probe of FIG. 6.

The output signals $S_1$ and $S_2$ from the detectors 8 and 9 are shown in FIG. 7, along with difference signal $d$. As in FIGS. 3 and 5, these signals are shown in solid lines for the normal incidence of the probe on the surface and in broken lines for an angle of incidence of, say, 13°. The curves $S_2$ corresponding to the detector 8 behind the diaphragm 7 are similar to the curves of FIG. 3, and the curves $S_1$ corresponding to the detector 9 behind the field lens 17A are similar to the curves shown in FIG. 5, that is to say inverted. Considering first of all the solid line curves representing the normal incidence, the output signals $S_1$ and $S_2$ intersect at two points, and the difference signal $d$ therefore passes through zero at these two points. The difference signal is substantially linear over a limited range on either side of both zeros, and, as in the previous embodiment, the value of the difference signal in its linear portions is proportional to the variations in the frontal distance from the reference distance corresponding to the zero crossing. The two null positions of the difference signal $d$ correspond respectively to the case in which both the diaphragm 7 and the field lens 17A are positioned in front of their planes of best focusing and the case in which they are both positioned behind their planes of best focusing.

When the angle of incidence of the probe on the surface varies from the normal, the curves $S_1$ and $S_2$ are displaced. However, it can be seen from FIG. 7 that their displacements are in opposite directions, the curve $S_1$ shifting to the right and the curve $S_2$ shifting to the left. This means that these shifts at least partially cancel each other so that the resulting shift in the difference curve is always very small.

Furthermore it is possible to arrange that there is no shift at all in one of the zeroes (chosen arbitrarily) of the difference curve for one particular angle of incidence, other than the normal incidence, and it is this case that has been shown for FIG. 7 for the left hand zero. This is possible because there are two parameters which can be adjusted, namely the position of the diaphragm 7 (and its corresponding detector 8) and the position of the screen 10A/field lens 17A (and its corresponding detector 9). The initial adjustment is carried out by setting the frontal distance to the surface at its reference value, for the normal incidence, and adjusting the positions of the diaphragm 7 (with its detector 8) and of the screen 10A/field lens 17A (with its detector 9) until the difference signal is null; this operation is then repeated for the oblique angle of incidence chosen, 13° in this example. This will affect the normal setting which will therefore need to be re-adjusted to bring the difference signal back to zero. This sequence is continued until the difference signal is null at both the normal and the oblique angles of incidence.

The resulting zero shift as a function of the angle of incidence is shown in FIG. 8 by curve III in which the two points of zero shift can be seen corresponding to the normal incidence and the value 13°. This value can be chosen arbitrarily but it is convenient to set it equal to about two thirds of the maximum angle of incidence to be permitted which in this case is about 20°. This maximum angle of incidence depends on the aperture of the objective 4.

In FIGS. 2, 4 and 6, the optical system through which the light is transmitted to the surface and then back again to the detectors has been shown schematically as a simple objective 4. This optical system could, however, be constituted otherwise, for example by two objectives spaced apart along the optical axis.

In both FIGS. 4 and 6, the light source 1 has been shown as an electroluminescent diode, and this is preferred. The light emitted can be modulated by modulating the electric current passing through the diode, and in this case the detectors would have to be arranged to de-modulate the signals picked up. Such modulation and de-modulation enables parasitic influences, such as variations in the ambient light, to be reduced.

The invention has been described with reference to an optical device for determining the contour of a surface, for example a car body or an aircraft wing. In this application the position of the probe is adjusted until the difference signal is null, with a view to maintaining the frontal distance from the probe to the surface constant. Another similar application is the measurement of the displacement of a surface. Here again the position of the probe is adjusted to maintain the frontal distance to the surface constant, so that the probe follows the surface. The displacement of the probe then represents the displacement of the surface. The invention is, however, not limited to these constant frontal distance applications although they are preferred; it can also be used for measuring the distance from the probe to the surface by calibrating the difference signal obtained.

We claim:

1. An optical device for determining the position of a point of a surface, comprising:
    a luminous source,
    an optical system for forming a primary image of the source on the surface at said point and for returning light back from the primary image, two photoelectric detectors 8, 9 which furnish electrical output signals $S_1$ and $S_2$. The disposition of the detectors is not critical, but they should be close enough to their corresponding diaphragms and large enough to detect all the light passing through the diaphragms. These signals are fed into a differential amplifier 20 whose output $d$ is equal to $S_1 - S_2$.

The optical device of FIG. 2 is shown in its correct probing position, so that the image I' is formed on the surface S at the reference distance BC from the probe, the point B being for example the optical center of the objective 4. This reference distance BC is chosen so that the image that forms on the surface is the best focused image, i.e. so that the point C is conjugate to the source. For a source optically at infinity the point C, and hence the image I', coincide with the focal point.

Figure 3:
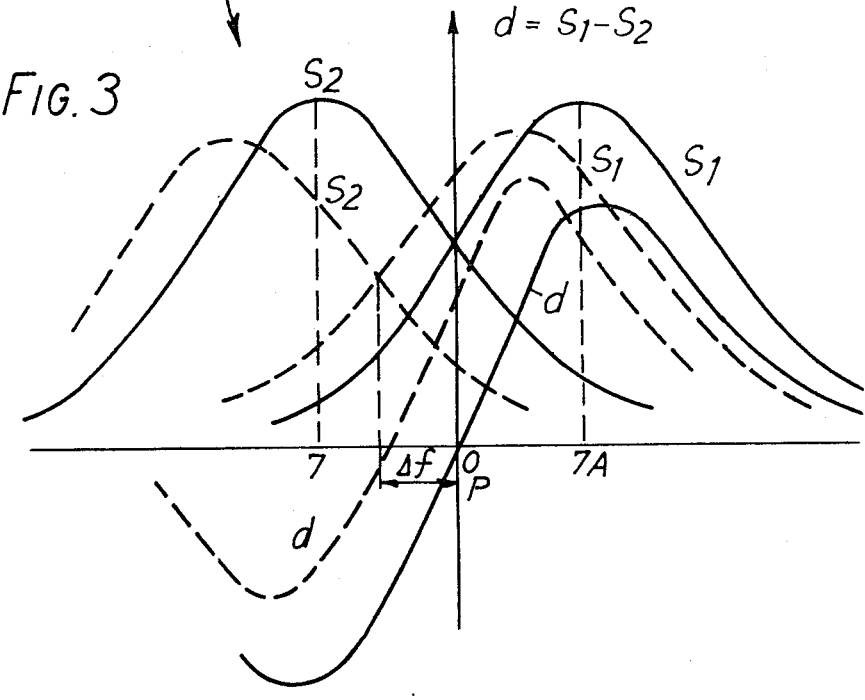
FIG. 3 is a diagram showing the curves of the outputs of the detectors of the probe of FIG. 1.

FIG. 3 shows the output signals produced by the probe as a function of the frontal distance $f$ from the probe to the surface, i.e. from the probe to the object, which is constituted by the image I'. However, because there is a one to one correspondence between points in the object space of the optical system 4 and their conjugate points in the image space, the $f$ axis has also been used to represent the position of the planes of best focusing P (conjugate to the plane containing the image/object I' — which is in turn the plane of best focusing of the source on the surface S) and also the positions of the diaphragms 7 and 7A. Two sets of curves are shown: one set, in solid lines, corresponds to one angle of incidence, in this case the normal incidence, and the other set, in broken lines, corresponds to another angle of incidence, say 13° from the normal, for example.

Considering first the normal set of curves in solid lines, the output signals produced by the detectors 8 and 9, namely the signals $S_1$ and $S_2$, each rise to a maximum at the point corresponding to the position of the diaphragm 7 or 7A and then descend again. The two curves $S_1$ and $S_2$ are generally of the same shape but are displaced from one another along the $f$ axis, and these curves intersect at a point which represents the planes of best focusing P.

The difference is taken between the signals $S_1$ and $S_2$ and this difference signal $d = S_1 - S_2$ is also shown in FIG. 3, in a solid line for the normal incidence, and in a broken line for the other, non-normal incidence. The difference signal $d$ is zero where the curves $S_1$ and $S_2$ intersect, and is substantially linear over a limited range on either side of the zero. The device is adjusted initially, for the normal incidence, so that the zero of the difference signal corresponds to the reference plane, in this case the plane of best focusing, located at the reference frontal distance from the probe. Variations in this distance are translated by a proportional value of $d$. The initial adjustment is carried out by setting the probe at the reference distance from the surface and moving the diaphragms 7 and 7A with their corresponding detectors 8 and 9 until the difference signal is zero.

When the device is used in normal operation, for each point explored, the probe is moved until the difference signal becomes null, with a view to bringing the frontal distance back to the reference value.

Although this device operates suitably in the case of perfectly diffusive surfaces, it is found that for reflective surfaces it is usable only for displacements parallel to the optical axis of the probe. As soon as there is a variation in the inclination of the probe to the normal at the point being probed, there is observed a shift of the maxima of the signals $S_1$ and $S_2$, which are represented under these conditions by the curves in broken lines in FIG. 3, and consequently there is a shift of the zero of the apparatus. In other words, it is as if there were a variation $\Delta f$ in the frontal probing distance with the angle of incidence. This error, which is due to the variable proportion of reflected flux contained in the light returned by the explored surface into the optical system increases with the angle of incidence of probing. This is shown by curve I in FIG. 8, which plots the shift in the zero, $\Delta f$, as a function of the angle of incidence $i$.

In order to reduce this error, the probe can be modified in accordance with one embodiment of this invention in the manner shown in FIG. 4, where elements that are common to those shown in FIG. 2 are designated with like reference numerals. In this embodiment each of the diaphragms 7, 7A of FIG. 2 is replaced by a corresponding field lens 17, 17A on which a circular central screen 10, 10A has been placed, both screens having the same diameter. The peripheral luminous fluxes passing through the field lens 17, 17A, around the central screens 10, 10A are then concentrated on their corresponding detectors 8, 9, which are situated in the planes that are conjugate to the plane of the exit pupil of the objective 4 with respect to the field lenses 17, 17A, although the position of the detectors is not critical. As in the case of FIG. 2, in which the diaphragms 7 and 7A were positioned on opposite sides of the planes P of best focusing, so in FIG. 4 the field lenses 17, 17A, or rather their screens 10, 10A, are disposed on opposite sides of the planes of best focusing P. This can be seen both in FIGS. 4 and 5.

Figure 5:
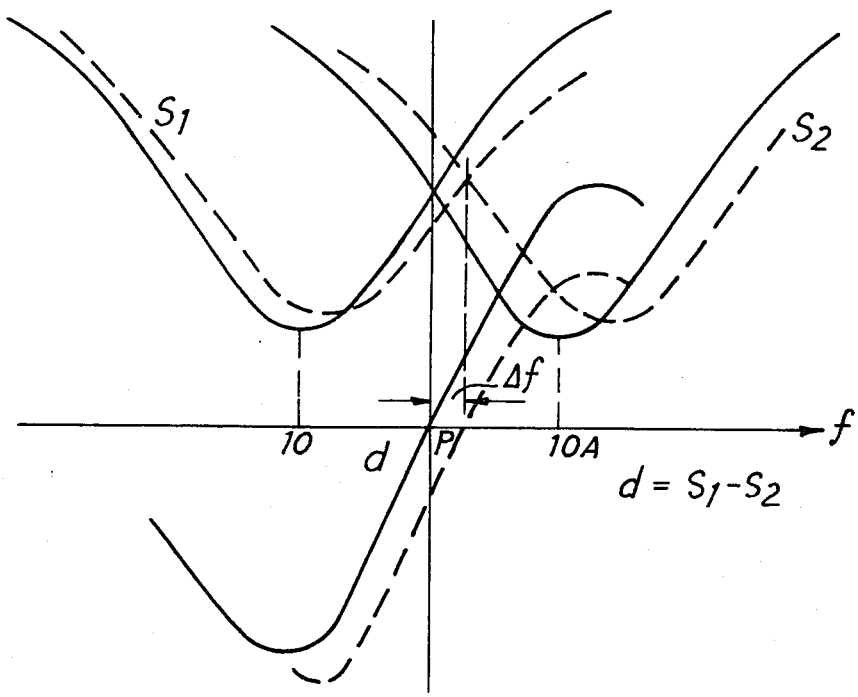
FIG. 5 is a diagram, analogous to FIG. 3, showing the curves of the outputs of the detectors of FIG. 4.

The outputs $S_1$ and $S_2$, and their difference $d = S_1 - S_2$ are shown in FIG. 5, in solid lines for the normal incidence and in broken lines for an oblique angle of incidence, say 13°, as in the case of FIG. 3. The curves $S_1$ and $S_2$ of FIG. 5 have the same general shape as they did in FIG. 3, but they are inverted. That is to say that they pass through a minimum rather than a maximum. The minima correspond to the positions of the screens 10, 10A.

These two curves still intersect at a point, at which their difference $d$ is zero, and which corresponds to the best focusing of the image on the surface under exploration. The difference signal $d$ is substantially linear over a limited range on either side of the zero, and its value in this linear portion is proportional to the difference between the actual frontal distance from the probe to the surface and the reference frontal distance from the probe to the plane of best focusing, i.e. proportional to variations in the frontal distance from the reference value.

The broken line curves of FIG. 5 show the signals $S_1$, $S_2$ and $d$ for the case in which the probe has a non-normal angle of incidence, for example 13°. In this case, as in FIG. 3, the curves $S_1$ and $S_2$, hence the difference curve $d = S_1 - S_2$, undergo a shift. In particular, the zero means for splitting the light returned by the optical system into two beams directed respectively towards two secondary image points lying respectively in two distinct focusing planes, two optical elements respectively disposed in said two beams, each said optical element controlling the amount of light passing therethrough, at least one of said optical elements comprising a lens provided with a central screen, and two photoelectric detectors respectively disposed behind said two optical elements for receiving light passing through those optical elements and for translating that light into electrical output signals which signals are a function of the position of said surface relative to said optical system.

2. An optical device according to claim 1, wherein said lens comprised in said optical element is a field lens.

3. An optical device according to claim 2 including means for forming the difference signal between the two electrical output signals from the detectors, said difference signal being representative of the position of said surface relative to said optical system.

4. An optical device according to claim 3 wherein each of said optical elements comprises a field lens provided with a central screen.

5. An optical device according to claim 4, wherein said two optical elements are so positioned that for a reference surface and for a reference angle of incidence of the incident light on that surface the said difference signal is null when said primary image is the best focused image of the source on the surface, said two optical elements then lying on opposite sides of their two corresponding focusing planes.

6. An optical device according to claim 3, wherein only one of said optical elements comprises a field lens provided with a central screen, the other optical element comprising a diaphragm.

7. An optical device according to claim 6, wherein said two optical elements are so positioned that for a reference surface and a reference angle of incidence of the incident light on that surface the said difference signal is null when said primary image is the best focused image of the source on the surface, said two optical elements then lying on the same side of their two corresponding focusing planes.

8. An optical device according to claim 7, wherein said two optical elements are so positioned that for the same reference surface and for the same best focusing of the primary image on the surface, said difference signal is null for two different reference angles of incidence of the incident light on the surface.

9. An optical device according to claim 6, wherein the central screen of the field lens and the aperture of the diaphragm are of the same diameter.

* * * * *